No. 799,332. PATENTED SEPT. 12, 1905.
N. W. HARTMAN.
GLASS PRESSING MACHINE.
APPLICATION FILED APR. 29, 1904.
5 SHEETS—SHEET 1.
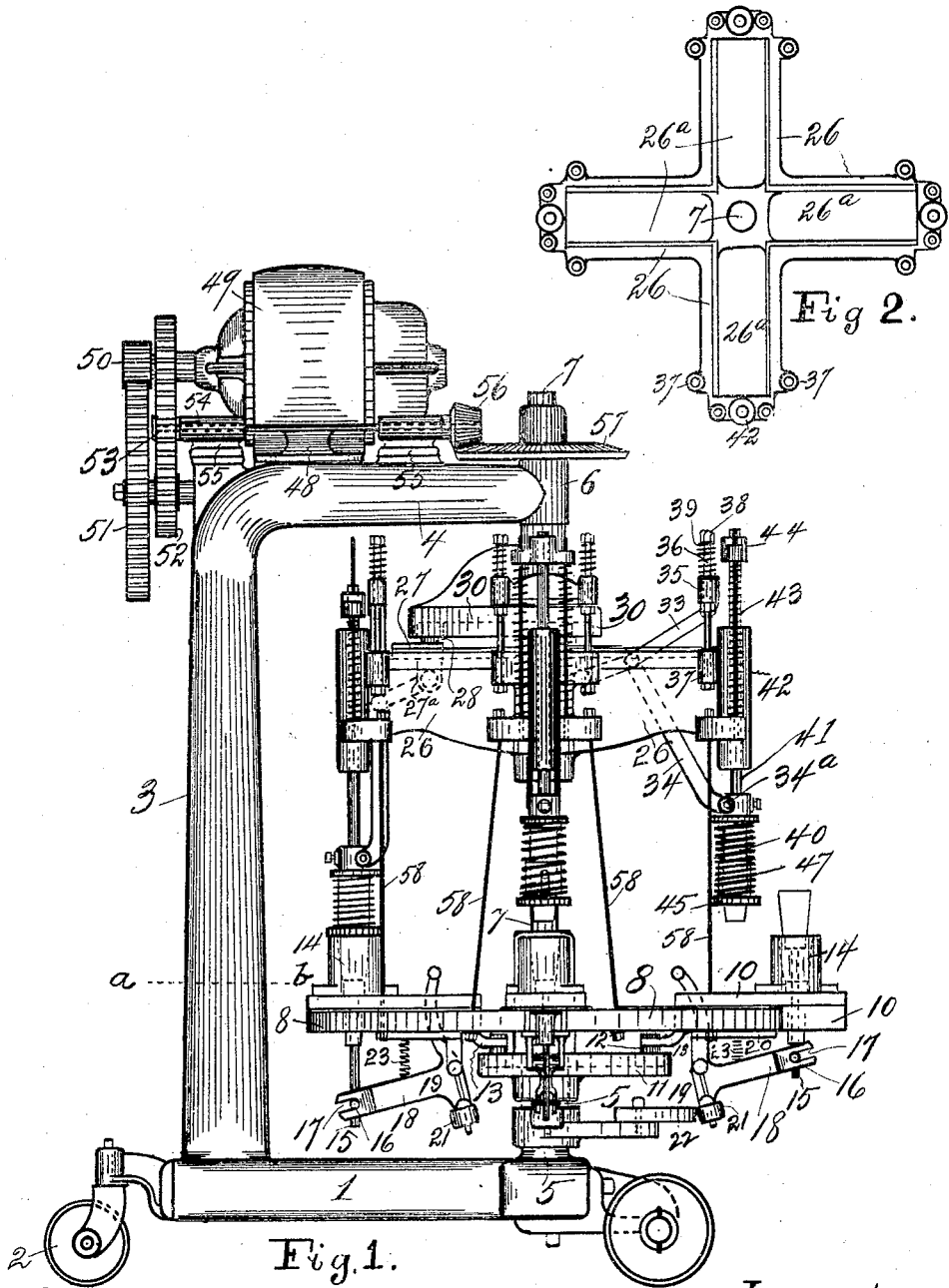
Witnesses.
M. Marks.
G. R. Adams.
Inventor:
Noble W. Hartman,
Simon Hall, Atty.

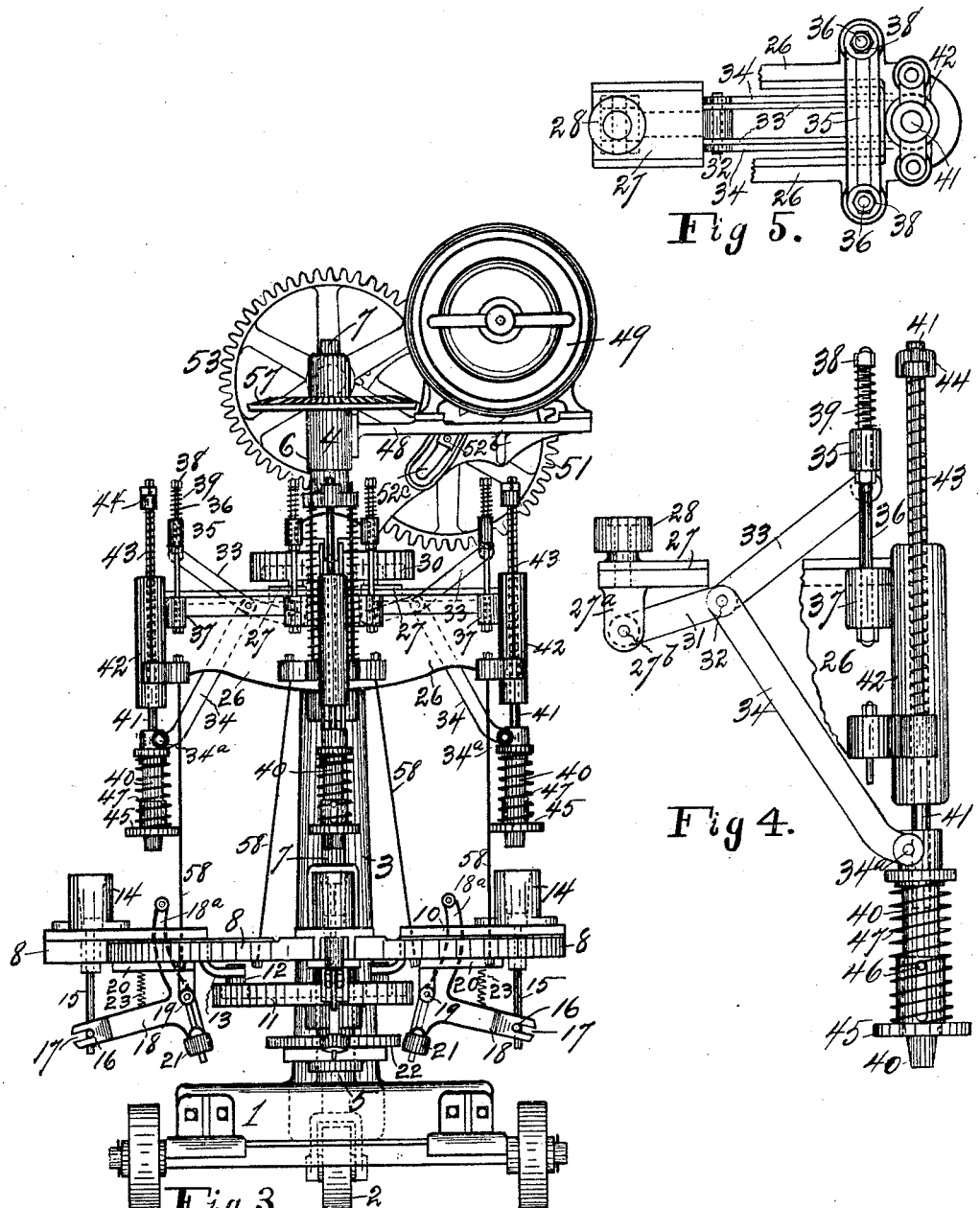

No. 799,332. PATENTED SEPT. 12, 1905.
N. W. HARTMAN.
GLASS PRESSING MACHINE.
APPLICATION FILED APR. 29, 1904.

5 SHEETS—SHEET 3.

Witnesses.
M. Marks.
G. R. Adams

Inventor:
Noble W. Hartman,
T. Hixson Hull, Atty.

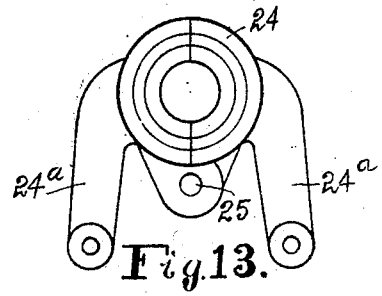
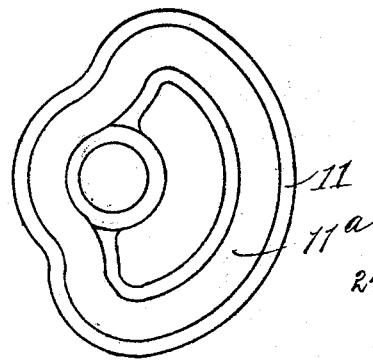
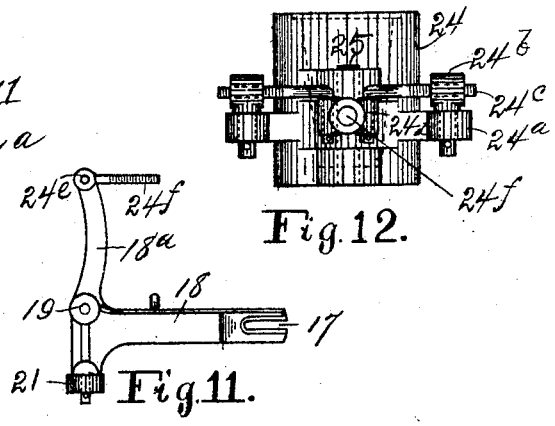
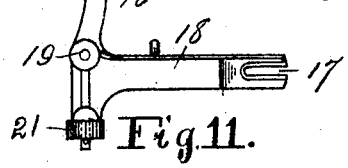
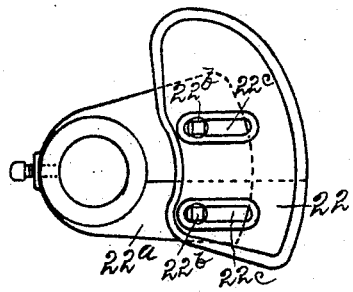

No. 799,332. PATENTED SEPT. 12, 1905.
N. W. HARTMAN.
GLASS PRESSING MACHINE.
APPLICATION FILED APR. 29, 1904.

5 SHEETS—SHEET 5.

Witnesses.
M. Marks.
G. R. Adams

Inventor:
Noble W. Hartman,
by Anson Hall, His Atty.

UNITED STATES PATENT OFFICE.

NOBLE W. HARTMAN, OF TOLEDO, OHIO, ASSIGNOR OF ONE-HALF TO GEORGE W. BURKHART, OF DETROIT, MICHIGAN.

GLASS-PRESSING MACHINE.

No. 799,332.  Specification of Letters Patent.  Patented Sept. 12, 1905.

Application filed April 29, 1904. Serial No. 205,451.

*To all whom it may concern:*

Be it known that I, NOBLE W. HARTMAN, a citizen of the United States, residing at Toledo, in the county of Lucas and State of Ohio, have invented certain new and useful Improvements in Glass-Pressing Machines; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to machines for the manufacture of articles of pressed glass, and is designed to provide a mechanism which by slight changes, which may be readily and conveniently made, may be used interchangeably with "cylinder-molds" for making articles having a smooth cylindrical or conical surface, such as tumblers and the like, or with "sectional" molds used in the making of articles having irregular exterior surfaces.

An object of my invention is to thus dispense with the necessity for the use of two different kinds of machines in the manufacture of hollow pressed glassware.

My invention also relates to certain details of construction hereinafter described, and pointed out in the claims.

I attain the objects above referred to by means of the devices and arrangement of parts hereinafter described and shown and illustrated in the accompanying drawings, in which—

Figure 7:
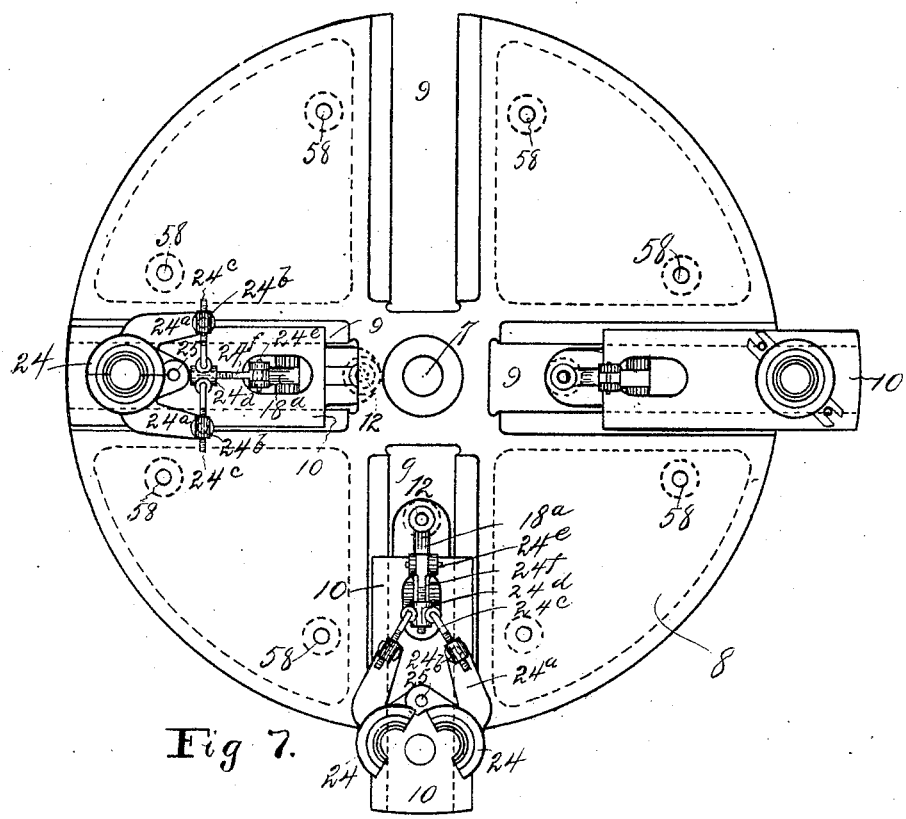
Figure 6:
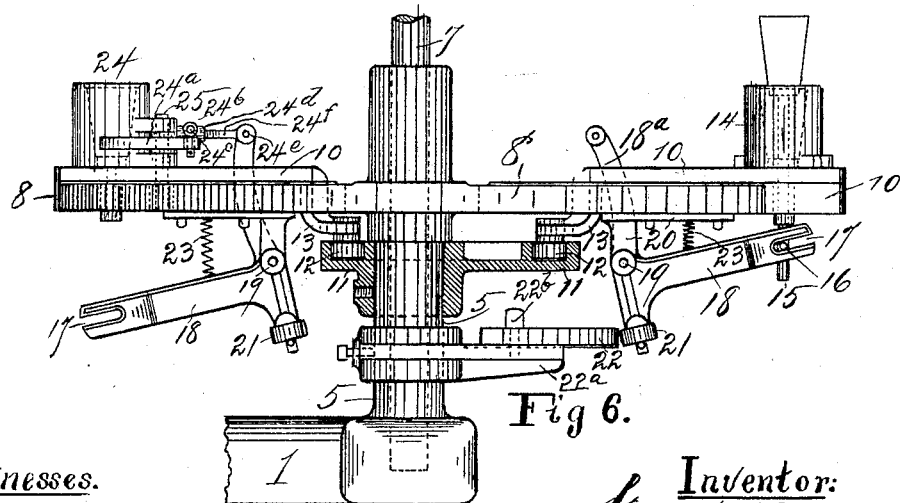
Figure 16:
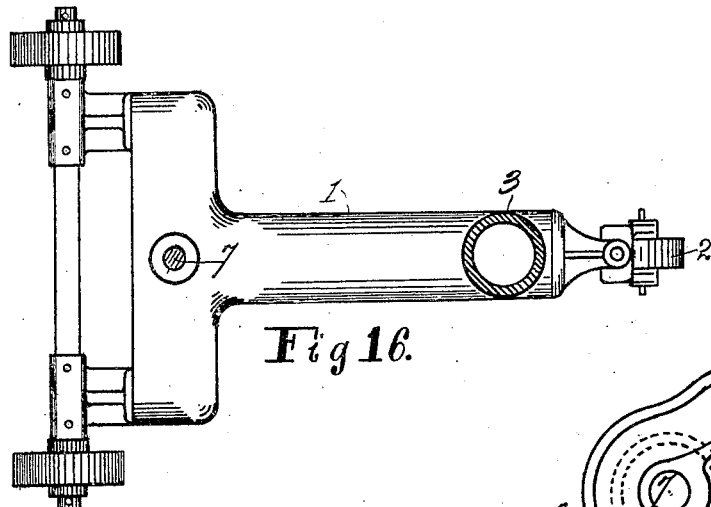
Figure 17:
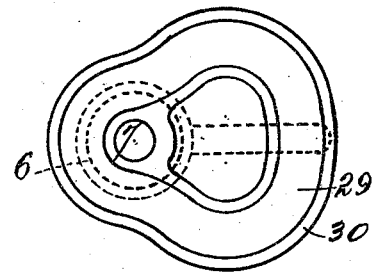
Figure 15:
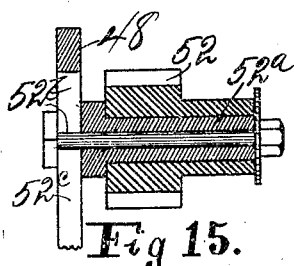
Figure 14:
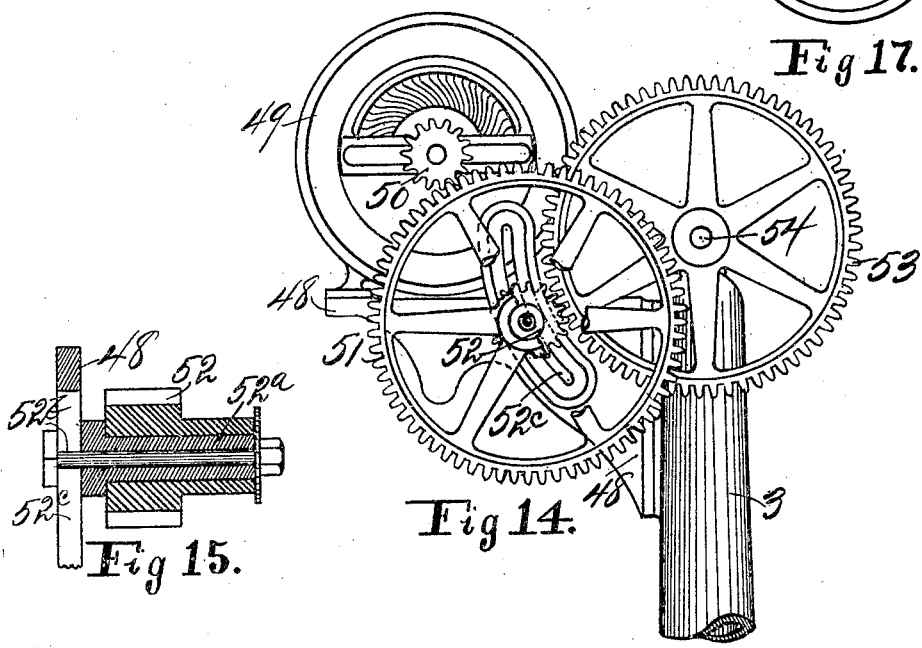

Figure 1 is a side elevation of my machine assembled and ready for use; Fig. 2, a top plan view of the housing which forms guides or ways for the toggle-actuating mechanism, hereinafter referred to, designed to actuate the plungers for the glass-molds; Fig. 3, a front elevation of the machine illustrated in Fig. 1; Fig. 4, an enlarged view, in side elevation, of a plunger, with its mold-ring, its actuating mechanism, and its adjusting mechanism in detail; Fig. 5, a top plan view of the same; Fig. 6, a side elevation, on an enlarged scale, of the revolving table, hereinafter referred to, showing the cams which actuate the "knock-out" mechanism, the mold opening and closing mechanism, and which move the mold-carriers radially upon the revolving table; Fig. 7, a top plan view of the same; Fig. 8, a top plan view in detail of the cam for actuating the knock-out, mold opening and closing mechanism, and illustrating the means for the adjustment of said cam; Fig. 9, a side elevation of the mold-carrier, showing the knock-out pin in position, partly in section, and showing means of adjusting the knock-out pin; Fig. 10, a top plan view of the cam for actuating the mold-carrier; Fig. 11, a side elevation in detail of the bell-crank lever, hereinafter referred to, designed to open and close the sectional molds and to actuate the knock-out pin for cylinder-molds; Fig. 12, a rear elevation of a sectional mold in closed position; Fig. 13, a top plan view of the same; Fig. 14, a rear elevation of the top part of the main housing, showing the motor-bracket, the motor for driving the machine, and the change-gear for changing the speed of the machine; Fig. 15, a central sectional elevation of the change-gear mechanism, hereinafter referred to; Fig. 16, a top plan view of the lower portion of the base and housing of the machine in section on line *a b*, Fig. 1; and Fig. 17 is a bottom plan view of the cam, hereinafter referred to, for driving the toggle mechanism which actuates the plungers of the machine.

Like numerals of reference indicate like parts throughout the drawings.

In the drawings, 1 is the base of my machine, mounted on wheels, by means of which the machine may be moved from place to place, there being preferably three wheels, one of which, 2, is swiveled as a caster.

3 is a pillar springing upright from the base and having at top an arm 4, turned forwardly over the base, the base, the pillar, and the arm constituting the main housing of the machine.

From the end of the base opposite the pillar 3 springs a short sleeve or fixed hollow shaft 5. At the extremity of the arm 4 is another sleeve 6 in axial alinement with the sleeve 5.

7 is the machine-shaft of my machine, having its bearings in the lower and upper sleeves 5 and 6.

8 is a circular table having at center a circular opening and a downwardly-projecting hub which rests upon the top of the hollow shaft or sleeve 5. The hub of the table is secured to the shaft, and the table revolves with the shaft 7. In the table 8 are radial slots 9, the margins of which form guides or ways for mold-carriers 10. For reasons hereinafter to be explained these mold-carriers are moved radially on their guides or ways, so that they occupy different positions relatively to the center of the table at different steps of the different operations. The radial movement of the mold-carriers is accomplished by means of a cam 11, (see Fig. 6,) fixed upon the sleeve 5, having an eccentric cam-race $11^a$ (see Fig. 10) in which travel cam-rollers 12, journaled upon studs 13 on the inner ends of the mold-carriers 10. As the table revolves the cam-rollers project and retract the mold-holders upon their guides or ways.

14 14 are cylinder-molds designed for forming articles having smooth cylindrical or conical surfaces. These molds are secured in any desired manner to the mold-carriers 10.

15 is a vertically-reciprocating pin, the enlarged top of which $15^a$ forms a separate bottom for the interior of the mold 14. Through the pin 15 passes a pin 16, which engages a slot or jaw 17 in the end of a bell-crank lever 18, fulcrumed, as at 19, upon a bracket 20, secured to the bottom side of the mold-carrier 10. (See Fig. 9.) The downwardly-projecting end of the bell-crank lever 18 carries a cam-roller 21, which at proper intervals rides upon the face of a cam 22, rigidly secured to the shaft or sleeve 5. When the cam-roller 21 comes in contact with the face of the cam 22, the bell-crank lever lifts the knock-out pin 15, and when the cam-roller passes away from the cam the bell-crank lever and the knock-out pin by their own gravity and by aid of springs 23, engaging an arm of the bell-crank, are depressed to their original position.

When a sectional mold is employed—that is to say, a mold the two halves of which are pivoted together and which open horizontally—I use the devices which are illustrated on an enlarged scale on the left-hand side of the drawings in Figs. 6 and 7. 24 is a sectional mold the two halves of which at their inner sides are pivoted or hinged together, as at 25. Each half of the mold is provided with an inwardly-projecting arm $24^a$. At the extremity of each of these arms is a swiveled eye $24^b$, into which is screwed a short rod $24^c$, threaded at one end and at its other end pivotally engaged with block $24^d$. This block is pivotally connected, as at $24^e$, by means of a screw-eye $24^f$, with the upper extremity of an arm $18^a$ of the bell-crank lever 18. (See Fig. 11.) When the cam-roller 21 rides upon the cam-face 22, the throw of the arm $18^a$ is inwardly toward the main shaft. The pull of the screw-eye $24^f$ opens the toggle $24^a$ $24^b$ $24^c$, causing the arms $24^a$ to approach each other and to swing the pivoted halves of the mold apart. When the cam-roller leaves the face of the cam, the opposite motion of these parts is caused by the spring 23. It will be observed that when the two screw-rods $24^c$ are in end-to-end alinement, as illustrated in Fig. 7, the mold parts are powerfully forced together and are locked in closed position. It will also be seen that by means of the screw connections between the parts $24^c$ and $24^b$ the sectional mold may be adjusted horizontally without interfering with the operation of the parts. To provide for the adjustment of the throw of the bell-crank lever 18, the cam 22 is made in two parts, the part $22^a$ (see Fig. 8) being rigidly secured to the shaft 5 and having bolts and nuts $22^b$, which engage slots $22^c$ in the part 22, the part 22 being movable and adjustable radially upon the part $22^a$, the bolts and nuts affording means for securing the two parts in fixed adjusted relation.

Rigidly secured to the shaft 7 is a cross-piece or frame 26, the arms of which coincide vertically with the slots 9 in the table 8. This piece is formed, preferably, of a single casting and is strengthened by means of downwardly-projecting webs cast integral with the piece. In the arms are openings or slots $26^a$ the margins of which form guides or ways for sliding blocks 27. (See Figs. 2 and 5.) Each of these sliding blocks carries a cam-roller 28, which travels in a cam-race 29 on the under side of a cam 30, secured rigidly to the fixed sleeve 6, projecting downwardly from the arm 4 of the frame of the machine. As the shaft 7 revolves, carrying with it the cross-arm 26, the slide-blocks 27 are caused to move radially in and out by the cam-rollers traveling in the cam-race 29. Projecting downwardly from each of the sliding blocks 27 is a lug or bracket $27^a$, to which is pivoted, as at $27^b$, one end of a stout bar 31, the other end of which is pivoted, as at 32, to upwardly-extending toggle-arms 33 and downwardly-extending toggle-arms 34. (See Figs. 4 and 5.) The arms 33 are pivotally connected to a cross-head 35, which slides at each end upon rods 36, secured, as at 37, to the cross-arm 26. On the top of the rod 36 is a nut 38, between which nut and the cross-head 35 is interposed a compression-spring 39, the tension of which may be adjusted by means of the nut. The toggle-arms 34 at their lower extremity are pivotally connected, as at $34^a$, to a plunger 40, which serves as a former for the interior of the article to be pressed or formed. This plunger is detachably secured to a guide-rod 41, which slides in a sleeve 42, formed upon the extremity of the cross-arm 26.

Each of the rods 41 is supported by a compression-spring 43, resting at its bottom on a lug formed upon the cross-arms 26 and engaging at top a cross-head 44, connected with the guide-rod 41. The office of these springs is to counterbalance the weight of the plunger and its connected parts. The adjustably-tensioned springs 39 exactly control the pressure of the plungers upon the molds, thus overcoming the usual frequent breaking of molds heretofore encountered in machines of this class due to "cutting in" too large charges of molten glass.

45 is a mold ring or cover for the mold and slides vertically upon the plunger 40. A pin 46 passes through the plunger 40, its projecting ends engaging vertical slots in the hub or sleeve of the mold-ring. The pin and slots form guides and stops limiting the movement of the mold-ring. Between the mold-ring and a flange on the plunger-head is interposed a compression-spring 47, which holds the mold-ring normally depressed.

Secured to the upper part of the upright 3 and to the arm 4 is a bracket 48, upon which is mounted and secured in the present instance, for illustration, an electric motor 49, the shaft of which carries a pinion 50, engaging a spur-gear 51, on the shaft of which is a pinion 52, which engages a gear-wheel 53 on counter-shaft 54, journaled on brackets 55 on the upright 3 and the arm 4. At the opposite end of the counter-shaft 54 is a beveled pinion 56, which engages a beveled gear-wheel 57, secured upon the upper end of the shaft 7.

To provide for varying the speed of my machine, I mount my gear-wheel 51 and pinion 52 upon a sleeve or shaft $52^a$, mounted upon a stud $52^b$, which is movable in the arc of a circle in a segmental slot $52^c$, formed in the bracket 48. (See Figs. 14 and 15.) The sleeve and stud are secured at any desired position by means of a nut on the threaded extremity of the stud. The segmental slot $52^c$ is an arc of a circle of which the shaft 54 is the center. The hub of the pinion 52 is reduced to receive the gear-wheel 51 and upon this hub may be slipped and secured a gear-wheel 51 of any desired size, the shaft $52^a$ being moved to and secured in such position that the teeth of the interchangeable wheels 51 will properly engage the teeth of the motor-pinion 50. Thus by moving the shaft of the wheel 51 and the pinion 52 in the arc described by the slot $52^c$ a gear-wheel 51 of any desired size may be introduced into the train of driving-gears and the speed of the machine may be correspondingly varied.

To insure stability and rigidity of the machine, the table 8 and the cross-arms 26 are connected and braced by means of truss-rods 58. The table and cross-arms being thus connected and being secured to the shaft 7 are compelled to move exactly in unison.

The operation of my machine is as follows: Assuming that cylindrical or conical objects having smooth exteriors are to be made and that corresponding cylinder-molds are to be employed, these molds are secured upon their mold-carriers 10. The table 8 and the plunger-carrying cross-arms 26 and their connected parts being in motion, a piece of molten glass is cut in to the mold 14. (Seen at the center in Fig. 1.) The table revolves to the left. The cam-roller 12, traveling in cam-race $11^a$, moves the mold-carrier 10 so that the mold 14 is directly beneath the plunger 40. As the mold-carrier approaches this point the plunger is forced downwardly by means of the toggle 33 34, actuated by the radial movement of the cam-roller 28 in cam-race 29 on the fixed cam 30. As the table and plunger continue their horizontal movement the plunger is withdrawn from the mold by the reverse movement of the toggle 33 34 and the cam-roller 38. At this moment the cam-roller 12 begins to slide the mold-holder outwardly clear of the plunger and within convenient reach of the operator. As the table continues its horizontal movement the cam-roller 21, coming in contact with the cam-face 22, swings the bell-crank lever 18, which elevates the knock-out 15, lifting the pressed article so that it may be conveniently and quickly removed from the mold. The mold continuing in its course, the cam-roller 21 leaves the cam-face 22, retracting the knock-out to the bottom of the mold by means of the spring 23. The outwardly-projected mold has now again come to the point where it is charged with a new portion of molten glass, and the operation may be continued indefinitely. It will be understood that as each of the molds passes the charging-point it is supplied with molten glass, and each mold is in turn charged and emptied, as above described, so that with each rotation of the table there have been pressed and discharged from the molds four of the pressed articles. When a sectional mold is to be used for forming articles with irregular exterior surfaces, the operation of my machine is substantially the same as above described, except that instead of employing a knock-out the cylinder-mold 14 and the knock-out 15 $15^a$ are removed and a sectional mold 24 is secured to the mold-carrier. The arm $18^a$ of the bell-crank lever 18 is then connected with the toggle $24^a$, $24^b$, $24^c$, and $24^d$ by means of the screw-eye $24^f$, as seen to the left in Figs. 6 and 7. Now when the pressed article is to be discharged from the mold the throw of the bell-crank lever 18 will cause the pivoted halves of the sectional mold to open, as hereinbefore described, so that the pressed article may be conveniently removed from the molds. The pressed article being removed from the open mold, the table continues its movement, and by the reverse movement of the bell-crank lever 18 the mold is tightly closed just before reaching the charging-point, ready for a new charge of molten glass.

Having described my invention, what I claim, and desire to secure by Letters Patent, is—

1. In a glass-pressing machine, a series of mold-carriers, a corresponding series of plungers, means for revolving said two series in harmony, means for actuating said plungers in succession, and means for successively projecting and retracting said carriers radially.

2. In a glass-pressing machine, a revoluble table, a series of mold-carriers thereon, and means for the radial projection and retraction of the carriers at fixed points in the rotation of the table.

3. In a glass-pressing machine, a revoluble table, means for securing a series of molds upon the table, a corresponding series of levers each adapted for interchangeable connection with a knock-out mechanism for a cylinder-mold or an opening and closing mechanism for a sectional mold, and means for automatically actuating said levers successively at fixed points in the rotation of the table.

4. In a glass-pressing machine, a vertical shaft, a revoluble table thereon, means for securing a series of glass-molds on the table, a series of bell-crank levers fulcrumed on and revoluble with the table, a cam-roller on each of said levers, a cam in the path of said rollers, a series of mechanisms for separating the pressed articles from their molds, and connections between said mechanisms and the bell-crank levers.

5. In a glass-pressing machine, a revoluble table, a glass-mold thereon having its two halves pivoted together, an arm for each of said halves, and a pair of rods swiveled upon the extremities of said pair of arms and swiveled together at their meeting ends, the arrangement of the rods being such that when they are in end-to-end alinement the mold is tightly closed, combined with means for actuating said rods at fixed points in the rotation of the table.

6. In a glass-pressing machine, a revoluble frame having cross-arms, vertical guides at the outer extremities of the cross-arms, plungers movable in the guides, springs which hold the plungers retracted, toggle-arms connected with and adapted to reciprocate the plungers, a fixed cam, and connections between the cam and the toggle-arms.

7. In a glass-pressing machine, an upright shaft, a table revoluble upon the shaft, a frame mounted upon the shaft above and corresponding to the table, a series of vertically-movable plungers mounted upon said frame, a corresponding series of glass-molds mounted upon the table, toggle-bars connected with each of said plungers, a radially-movable block connected with said toggle-bars, a cam fixed upon the machine, and a cam-roller upon the block in engagement with the cam.

8. In a glass-pressing machine, a revoluble table, a series of glass-molds thereon, mechanisms for separating the pressed articles from their molds, levers for actuating said mechanisms, cam-rollers on said levers, a cam for engagement with said rollers, and means for the radial adjustment of said cam.

9. In a glass-pressing machine, a base, a pillar thereon having at top a horizontal arm, a shaft journaled at bottom in the base and at top in the arm, a train of driving-gears connected with the shaft and disposed upon said arm, a table and cross-arms secured to and revoluble with the shaft, a series of mold-carriers on the table, molds thereon, a corresponding series of plungers on the cross-arms, means for actuating the plungers at fixed points in the rotation of the shaft, means for separating the pressed articles from their molds at a fixed point in the rotation of the shaft, and means for radially reciprocating the mold-carriers at fixed points in the rotation of the shaft.

10. In a glass-pressing machine, a shaft, a mold-carrying table fixed to and revoluble with the shaft, cross-arms which carry the plungers and which are fixed to and revoluble with the shaft, a fixed sleeve in which the lower end of the shaft revolves, a fixed cam on said sleeve, mechanisms actuated by said cam for separating the pressed articles from their molds, a fixed sleeve in which the upper end of the shaft revolves, a cam fixed on said latter sleeve, and mechanisms, actuated by said latter cam, for actuating said plungers.

11. In a glass-pressing machine, a base, a pillar thereon having at top a horizontal arm, a shaft journaled at bottom in the base and at top in the arm, a table revoluble with the shaft, cross-arms above the table revoluble with the shaft, means for securing a series of molds in operative relation with the revoluble table, a corresponding series of plungers on the cross-arms, means for actuating the plungers at fixed points in the rotation of the shaft, means for separating the pressed articles from the molds at a fixed point in the rotation of the shaft, means for radially reciprocating the molds, a train of driving-gears disposed upon the arm of the pillar and connected with the shaft, and means in said train of gearing for the adjustment of the speed thereof.

In testimony whereof I affix my signature in presence of two witnesses.

NOBLE W. HARTMAN.

Witnesses:
LOUIS SKRANSEOFKY,
M. MARKS.